United States Patent
Toriyabe

(10) Patent No.: US 10,419,624 B2
(45) Date of Patent: Sep. 17, 2019

(54) IMAGE FORMING APPARATUS AND IMAGE FORMING METHOD

(71) Applicant: CANON KABUSHIKI KAISHA, Tokyo (JP)

(72) Inventor: Hiroyuki Toriyabe, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 15/414,309

(22) Filed: Jan. 24, 2017

(65) Prior Publication Data

US 2017/0134594 A1 May 11, 2017

Related U.S. Application Data

(63) Continuation of application No. 14/626,684, filed on Feb. 19, 2015, now Pat. No. 9,584,674.

(30) Foreign Application Priority Data

Feb. 21, 2014 (JP) .................... 2014-032210
Jul. 23, 2014 (JP) .................... 2014-149938

(51) Int. Cl.
*G06F 15/00* (2006.01)
*H04N 1/00* (2006.01)
*H04N 1/60* (2006.01)

(52) U.S. Cl.
CPC ....... *H04N 1/00084* (2013.01); *H04N 1/6036* (2013.01); *H04N 1/6097* (2013.01)

(58) Field of Classification Search
CPC ............. H04N 1/4078; H04N 1/00084; H04N 1/6036; H04N 1/6097
USPC ........................................ 358/1.2
See application file for complete search history.

(56) References Cited

U.S. PATENT DOCUMENTS

| 2003/0081036 A1* | 5/2003 | Hall ..................... B41J 2/165 347/19 |
| 2007/0086801 A1* | 4/2007 | Sakato ............... G03G 15/5037 399/50 |
| 2008/0123121 A1* | 5/2008 | Sagimori ........... G03G 15/5062 358/1.9 |

(Continued)

OTHER PUBLICATIONS

Machine translation of Japanese Patent Document No. 2006-212918m Naoki, Aug. 17, 2006.*

*Primary Examiner* — Mark R Milia
(74) *Attorney, Agent, or Firm* — Canon U.S.A., Inc. IP Division

(57) ABSTRACT

An image forming apparatus includes a correction unit configured to execute first correction processing to be executed to bring reproduction characteristics of an image formed by an image forming unit close to a target value and second correction processing different from the first correction processing, and an adjustment unit configured to execute a plurality of adjustment processing including the second correction processing, wherein correction processing by the correction unit is set to be executed at a predetermined timing, and wherein in a case that correction processing by the correction unit is executed at the set timing after adjustment processing is executed by the adjustment unit, the image forming apparatus performs control not to execute the second correction processing included in the adjustment processing and to execute the second correction processing after executing the first correction processing by the correction unit.

9 Claims, 19 Drawing Sheets

(56) References Cited

U.S. PATENT DOCUMENTS

2012/0162828 A1\* 6/2012 Holsen .................... G06F 1/263
361/1

\* cited by examiner

FIG.6

| EXECUTION ORDER | 1 | 2 | 3 | 4 | 5 |
|---|---|---|---|---|---|
| PROCESSING | PROCESSING A | PROCESSING B | PROCESSING C | PROCESSING D | PROCESSING E |
| STOPPABILITY | YES | NO | YES | NO | NO |
| OVERLAP WITH CALIBRATION | NO | NO | YES | NO | YES |

| EXECUTION ORDER AFTER RESTART | 1 | 2 |
|---|---|---|
| PROCESSING | PROCESSING B | PROCESSING D |

|  | SHEET GRAMMAGE | | |
| --- | --- | --- | --- |
|  | 80g - 200g | 200g - 250g | 250g - 300g |
| IMAGE FORMING MODE | MODE 1 | MODE 2 | MODE 3 |
| CALIBRATION EXECUTION MODE | MODE 1 | MODE 2 | MODE 3 |

FIG.15

| EXECUTION ORDER | 1 | 2 | 3 | 4 | 5 | 6 | 7 | 8 | 9 | 10 | 11 |
|---|---|---|---|---|---|---|---|---|---|---|---|
| PROCESSING | PROCESSING A | PROCESSING B | PROCESSING B | PROCESSING B | PROCESSING C | PROCESSING C | PROCESSING C | PROCESSING D | PROCESSING E | PROCESSING E | PROCESSING E |
| STOPPABILITY | YES | NO | NO | NO | YES | YES | YES | NO | NO | NO | NO |
| TARGET IMAGE FORMING MODE | COMMON | MODE 1 | MODE 2 | MODE 3 | MODE 1 | MODE 2 | MODE 3 | COMMON | MODE 1 | MODE 2 | MODE 3 |
| OVERLAP WITH CALIBRATION | NO | NO | NO | NO | YES | YES | YES | NO | YES | YES | YES |

| EXECUTION ORDER | 1 | 2 | 3 | 4 | 5 | 6 | 7 | 8 |
|---|---|---|---|---|---|---|---|---|
| PROCESSING | PROCESSING B | PROCESSING B | PROCESSING B | PROCESSING C | PROCESSING C | PROCESSING D | PROCESSING E | PROCESSING E |
| TARGET IMAGE FORMING MODE | MODE 1 | MODE 2 | MODE 3 | MODE 1 | MODE 3 | COMMON | MODE 1 | MODE 3 |

| EXECUTION ORDER | 1 | 2 | 3 | 4 | 5 | 6 | 7 | 8 | 9 |
|---|---|---|---|---|---|---|---|---|---|
| PROCESSING | PROCESSING A | PROCESSING B | PROCESSING B | PROCESSING B | PROCESSING C | PROCESSING C | PROCESSING D | PROCESSING E | PROCESSING E |
| TARGET IMAGE FORMING MODE | COMMON | MODE 1 | MODE 2 | MODE 3 | MODE 1 | MODE 3 | COMMON | MODE 1 | MODE 3 |

| EXECUTION ORDER | 1 | 2 | 3 | 4 | 5 | 6 |
|---|---|---|---|---|---|---|
| PROCESSING | PROCESSING B | PROCESSING B | PROCESSING B | PROCESSING C | PROCESSING D | PROCESSING E |
| TARGET IMAGE FORMING MODE | MODE 1 | MODE 2 | MODE 3 | MODE 1 | COMMON | MODE 1 |

| EXECUTION ORDER | 1 | 2 | 3 | 4 | 5 | 6 | 7 |
|---|---|---|---|---|---|---|---|
| PROCESSING | PROCESSING A | PROCESSING B | PROCESSING B | PROCESSING B | PROCESSING C | PROCESSING D | PROCESSING E |
| TARGET IMAGE FORMING MODE | COMMON | MODE 1 | MODE 2 | MODE 3 | MODE 1 | COMMON | MODE 1 |

1900

IMAGE FORMING APPARATUS AND IMAGE FORMING METHOD

CROSS-REFERENCE TO RELATED APPLICATIONS

This application is a continuation of U.S. patent application Ser. No. 14/626,684, filed Feb. 19, 2015, which claims the benefit of Japanese Patent Application No. 2014-032210, filed Feb. 21, 2014, and Japanese Patent Application No. 2014-149938, filed Jul. 23, 2014, all of which are hereby incorporated by reference herein in their entirety.

BACKGROUND OF THE INVENTION

Field of the Invention

The present invention relates to an image forming apparatus which performs control to optimize adjustment processing performed within the apparatus according to an execution reservation of calibration.

Description of the Related Art

Some of recent electrophotographic method image forming apparatuses are equipped with an internal adjustment function executed at startup. The internal adjustment function is to automatically execute "cleaning of each unit in the apparatus", "adjustment processing", "in-apparatus density adjustment" for stabilizing output, and the like immediately after startup of the image forming apparatus. One example of the in-apparatus density adjustment is a correction unit using a patch image formed on an intermediate transfer member. The patch image is read by a sensor disposed near the intermediate transfer member, and a measurement result is reflected in various image formation conditions, such as a voltage condition and laser power, so that a maximum density and a halftone characteristic can be corrected.

The in-apparatus density adjustment is performed other occasion than the startup of the apparatus in some cases. Output characteristics of the electrophotographic method image forming apparatus varies according to a degree of use of the image forming unit or a change in an ambient environment. Thus, the in-apparatus density adjustment is automatically executed every certain number of outputs, so that an image quality can be kept at a certain level without troubling a user.

In addition, many image forming apparatuses are equipped with an "on-paper density adjustment" function for further stabilizing output of their own. The on-paper density adjustment is to read a patch image formed on a sheet by a predetermined measurement unit and reflect a read result in the above-described image formation conditions. Since the output characteristics of the image forming apparatus when actually forming an image on a sheet is reflected, when compared to the previously described in-apparatus density adjustment, output stabilization can be realized more accurately in response to a use environment of a user and a sheet type.

Generally, when a user instructs execution of calibration by himself or herself for stabilization of image quality, both of the on-paper density adjustment and the in-apparatus density adjustment are often performed in turn. First, the on-paper density adjustment is performed, and correction is performed using a measurement result of the output characteristics when an image is formed on a sheet. Then, after performing the on-paper density adjustment, the in-apparatus density adjustment is performed. This process is performed for creating a target value for the in-apparatus density adjustment to be performed every certain number of subsequent outputs.

A user who requires a certain level of accuracy for image output instructs execution of calibration by himself or herself when starting up the image forming apparatus. At that time, same processing is overlapped in the in-apparatus density adjustment included in the internal adjustment function to be executed immediately after the startup of the apparatus and in the in-apparatus density adjustment included in the calibration processing to be then executed in response to the instruction of the user. The overlap of the processing causes problems of not only generation of an unnecessary wait time from the startup of the apparatus to the completion of the calibration but also progression of toner consumption and wear and tear of the image forming unit.

As a method for solving the problems, a method is discussed for avoiding overlap of calibration execution instructions (see Japanese Patent Application Laid-Open No. 2006-212918). In Japanese Patent Application Laid-Open No. 2006-212918, a method is discussed which performs control, when instructions to execute same type calibration are overlappingly issued, not to execute the calibration latterly instructed.

However, according to the above-described conventional technique, if a user issues an instruction to execute calibration immediately after the startup of the image forming apparatus and during execution of the internal adjustment processing, the in-apparatus density adjustment included in the internal adjustment processing is performed. Then, when the calibration instructed by the user is executed, the in-apparatus density adjustment included in a series of the processing is not performed. In other words, the in-apparatus density adjustment using a measurement result of the output characteristics when an image is actually formed on a sheet is not performed. Therefore, an original image stabilization effect cannot be achieved in some cases in the above-described in-apparatus density adjustment to be performed every certain number of outputs.

Thus, the present invention is directed to realization of an image forming apparatus which can reduce a wait time and consumption of consumable products while maintaining an image quality to which a measurement result of the output characteristics when an image is actually formed on a sheet is reflected.

SUMMARY OF THE INVENTION

According to an aspect of the present invention, an image forming apparatus includes a correction unit configured to execute first correction processing to be executed to bring reproduction characteristics of an image formed by an image forming unit close to a target value and second correction processing different from the first correction processing and an adjustment unit configured to execute a plurality of adjustment processing including the second correction processing, wherein correction processing by the correction unit is set to be executed at a predetermined timing, and wherein in a case that correction processing by the correction unit is executed at the set timing after adjustment processing is executed by the adjustment unit, the image forming apparatus performs control not to execute the second correction processing included in the adjustment processing and to execute the second correction processing after executing the first correction processing by the correction unit.

Further features of the present invention will become apparent from the following description of exemplary embodiments with reference to the attached drawings.

According to the present invention, the image forming apparatus can reduce a wait time necessary for execution of calibration and consumption of the consumable products while maintaining an image quality to which a measurement result of the output characteristics when an image is actually formed on a sheet is reflected.

BRIEF DESCRIPTION OF THE DRAWINGS

FIG. 6 is an example of an information table A 600 of the internal adjustment processing according to the first exemplary embodiment and the second exemplary embodiment.

FIG. 7 is an example of a reset table A 700 of the internal adjustment processing according to the first exemplary embodiment.

FIG. 11 illustrates relationship among sheet information, an image forming mode, and a calibration execution mode according to the third exemplary embodiment and the fourth exemplary embodiment.

FIG. 15 is an example of an information table C 1500 of the internal adjustment processing according to the third exemplary embodiment and the fourth exemplary embodiment.

FIG. 16 is an example of a reset table B 1600 of the internal adjustment processing according to the third exemplary embodiment.

FIG. 17 is an example of an information table D 1700 of the internal adjustment processing according to the third exemplary embodiment.

FIG. 18 is an example of a reset table C 1800 of the internal adjustment processing according to the fourth exemplary embodiment.

FIG. 19 is an example of an information table E 1900 of the internal adjustment processing according to the fourth exemplary embodiment.

DESCRIPTION OF THE EMBODIMENTS

Various exemplary embodiments, features, and aspects of the present invention will be described in detail below with reference to the drawings.

Figure 1:
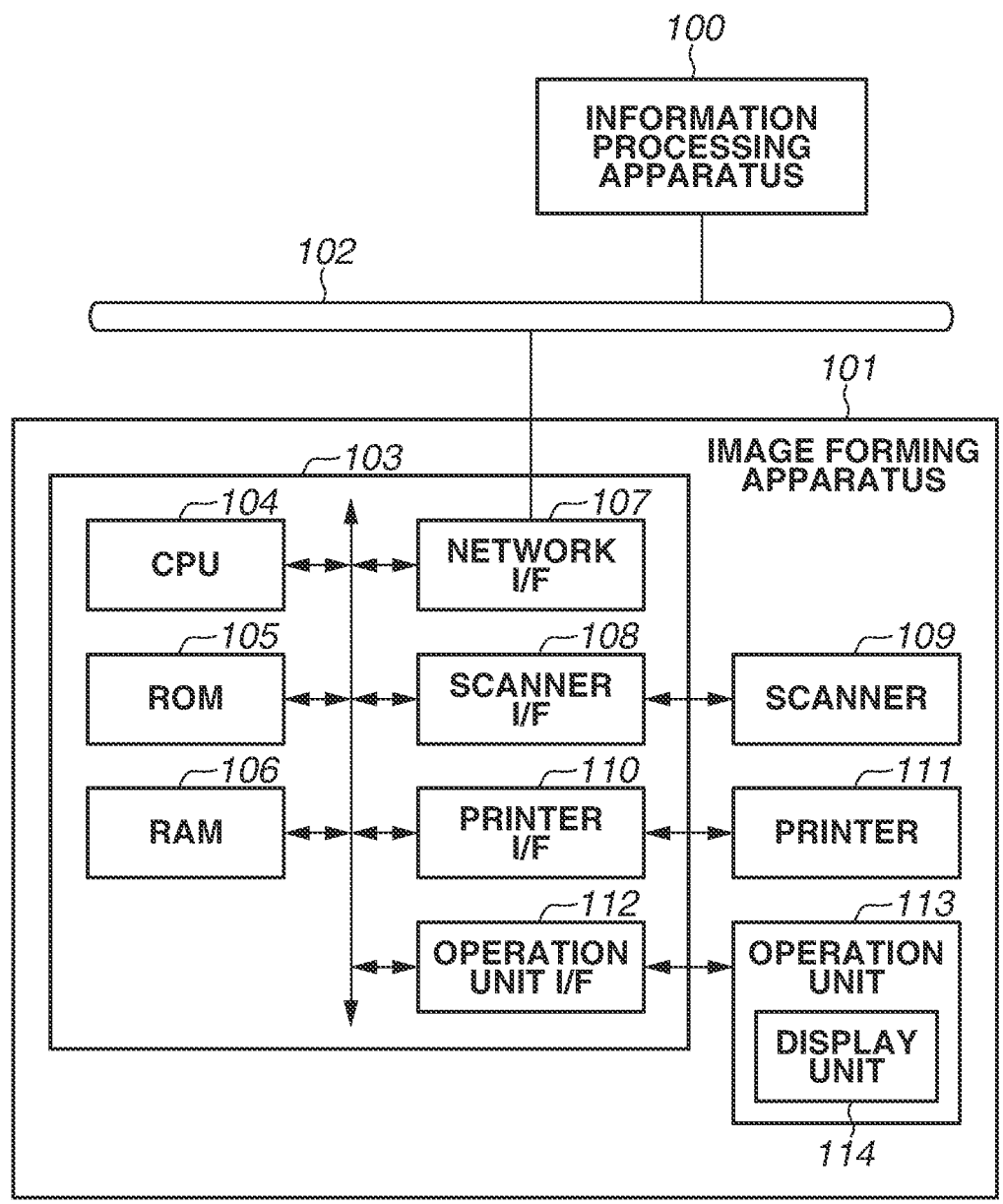
FIG. 1 is a block diagram illustrating an entire configuration of an image forming system.

FIG. 1 is a block diagram illustrating an entire configuration of an image forming system according to exemplary embodiments of the present invention. The image forming system includes an image forming apparatus 101 and an information processing apparatus 100. The information processing apparatus 100 and the image forming apparatus 101 are connected to a local area network (LAN) 102 so as to communicate with each other. The image forming apparatus 101 may be a multi-function peripheral (MFP) or a single function peripheral (SFP). The image forming apparatus 101 includes an image control unit 103, a scanner 109, a printer 111, and an operation unit 113. The image control unit 103 controls the scanner 109, the printer 111, and the operation unit 113.

A central processing unit (CPU) 104 reads a control program stored in a read-only memory (ROM) 105 to execute various control processing including printing control or the like. A random access memory (RAM) 106 is used as a temporary storage area, such as a main memory and a work area, of the CPU 104. A scanner interface (I/F) 108 connects the scanner 109 to the image control unit 103. Image data of a document read by the scanner 109 is transmitted to the image control unit 103 via the scanner I/F 108 and used for printing, storage, transfer, or the like. A printer I/F 110 connects the printer 111 to the image control unit 103. Image data to be printed by the printer 111 is transmitted from the image control unit 103 to the printer 111 via the printer I/F 110 and printed on a sheet by the printer 111. An operation unit I/F 112 connects the operation unit 113 to the image control unit 103. The operation unit 113 may have various configurations, such as a unit only including a switch or a light emitting diode (LED) and a unit including a touch panel type liquid crystal display (LCD) unit. Information input via the operation unit 113 is transmitted to the CPU 104 via the operation unit I/F 112, subjected to necessary processing by the CPU 104, and displayed on a display unit 114 included in the operation unit 113. A network I/F 107 connects the image control unit 103 to the LAN 102. The network I/F 107 receives print data and various information pieces from the information processing apparatus 100 on the LAN 102.

Figure 2:
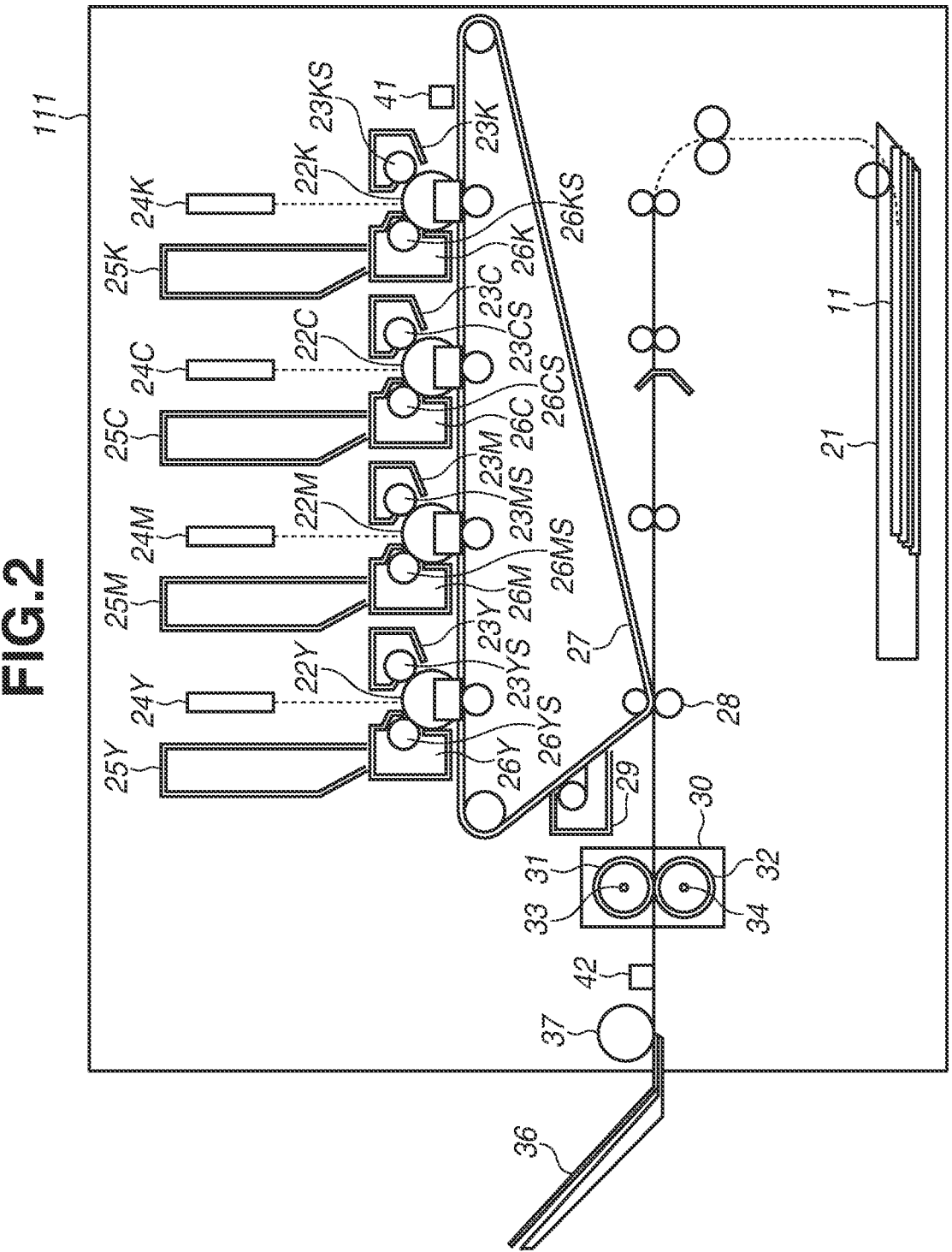
FIG. 2 is a cross section of a printer 111.

Next, operations of the printer 111 in the electrophotographic method image forming apparatus 101 are described with reference to FIG. 2. The printer 111 forms an electrostatic latent image by exposure light turned on based on an exposure time converted by the image control unit 103 and develops the electrostatic latent image to form a single color toner image. Then, the printer 111 overlaps the single color toner images with each other to form a multicolor toner image, transfers the multicolor toner image to a sheet 11, and fixes the multicolor toner image on the sheet 11.

The printer 111 includes a sheet feeding unit, photosensitive members 22Y to 22K, injection chargers 23Y to 23K, toner cartridges 25Y to 25K, development devices 26Y to 26K, an intermediate transfer member 27, a transfer roller 28, a cleaning means 29, and a fixing unit 30. The sheet feeding unit includes a sheet feeding tray 21 and a manual feeding tray, not illustrated, on which the sheets 11 are stacked. The printer 111 may include a plurality of sheet feeding trays to load different types and sizes of sheets on each tray.

The above-mentioned photosensitive drums (photosensitive members) 22Y to 22K have a configuration in which an organic photoconductive layer is applied on an outer circumference of an aluminum cylinder, and a driving force is transmitted from a driving motor, not illustrated, to the photosensitive drums to rotate. The driving motor rotates the photosensitive drums 22Y to 22K in a counterclockwise direction in response to an image forming operation.

Four injection chargers 23Y to 23K for charging the photosensitive members of yellow (Y), magenta (M), cyan (C), and black (K) are provided for each station as primary charging means, and the injection chargers respectively include sleeves 23YS to 23KS.

Exposure light to the photosensitive drums 22Y to 22K is transmitted from scanner units 24Y to 24K, and surfaces of the photosensitive drums 22Y to 22K are selectively exposed to the light, so that an electrostatic latent image is formed.

Four development devices 26Y to 26K for developing yellow (Y), magenta (M), cyan (C), and black (K) toners to visualize the electrostatic latent image are provided for each station as development means, and the development devices respectively includes sleeves 26YS to 26KS. Each development device is detachably mounted.

The intermediate transfer member 27 contacts the photosensitive drums 22Y to 22K and rotates in a clockwise direction in association with the rotation of the photosensitive drums 22Y to 22K when an image is formed, so that a single color toner image is transferred thereto. Then, a transfer roller 28 is brought into contact with the intermediate transfer member 27 to hold the sheet 11 therebetween and convey the sheet 11, and the multicolor toner image on the intermediate transfer member 27 is transferred to the sheet 11.

The fixing unit 30 which conveys the sheet 11 and melts and fixes the transferred multicolor toner image to the sheet 11 includes a fixing roller 31 to heat the sheet 11 and a pressure roller 32 to press and contact the sheet 11 to the fixing roller 31. The fixing roller 31 and the pressure roller 32 have a hollow structure and respectively include heaters 33 and 34 inside of them. In other words, the sheet 11 on which a multicolor toner image is formed is conveyed, heated, and pressed by the fixing roller 31 and the pressure roller 32, so that toner is fixed on the sheet surface.

The sheet 11 after fixing of the toner image is then discharged by a discharge roller 37 to a discharge tray 36, and the image forming operation is completed. The cleaning means 29 removes toner remaining on the intermediate transfer member 27, and waste toner remaining after transferring the four color toner image formed on the intermediate transfer member 27 to the sheet 11 is collected to a cleaner container.

A density sensor 41 is disposed toward the intermediate transfer member 27 to detect density of a toner patch formed on the surface of the intermediate transfer member 27. The CPU 104 reflects the measurement value to a calibration table for correcting density and gradation characteristics in the image control unit 103 and each image formation condition on the image forming unit to execute in-apparatus density adjustment processing.

A color sensor 42 is disposed toward an image forming surface of the sheet 11 on downstream of the fixing unit 30 to detect a red-green-blue (RGB) output value of a color of a mixed color patch which is formed and fixed on the sheet 11. The color sensor 42 is disposed within the color image forming apparatus 101, so that the detection can be automatically performed before a sheet after fixing of an image is discharged to the discharge unit. According to a first exemplary embodiment, the density sensor 41 and the color sensor 42 are described as examples of measurement means of a patch image, the measurement means are not limited to them. For example, a configuration which measures a spectral reflectance of a patch image using a spectral colorimeter to perform various image quality correction processing may be employed.

Next, internal adjustment processing to be performed immediately after the startup of the image forming apparatus 101 is described below.

When a power source of a printer is changed from off to on, the CPU 104 controls the image forming apparatus 101 to perform the internal adjustment processing. If the CPU 104 detects that a user turns on a power source switch, not illustrated, of the image forming apparatus 101, or a startup time preliminarily reserved has come, the CPU 104 turns on the power source of the printer 111.

Figure 3:
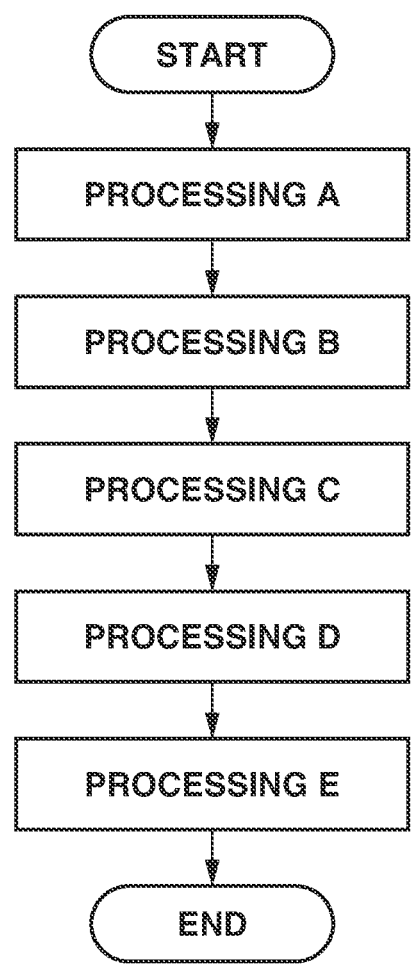
FIG. 3 illustrates a processing flow of internal adjustment processing according to a first exemplary embodiment and a second exemplary embodiment.

FIG. 3 illustrates a processing flow of the internal adjustment processing according to the first exemplary embodiment. According to the present exemplary embodiment, the internal adjustment processing includes five types of processing, i.e. processing A to the processing E, as illustrated in FIG. 3. According to the present exemplary embodiment, the number of processing in the internal adjustment processing are five for simplifying the description, however the number of processing may be larger or smaller than five in actual processing.

The internal adjustment processing includes processing which is not performed in calibration to be executed by an instruction from a user. For example, cleaning of the image forming units, such as the intermediate transfer member 27 and the photosensitive drums 22Y to 22K, and temperature control of the fixing unit 30 fall within the relevant processing. On the other hand, the internal adjustment processing includes processing which is performed during the execution of calibration. For example, the in-apparatus density adjustment processing falls within the relevant processing. Further, adjustment processing, such as refreshment processing of the development device and potential control of an image forming process, which needs to be performed prior to the in-apparatus density adjustment falls within the internal adjustment processing. As described above, the internal adjustment processing for adjusting parameters related to image formation includes a plurality of processing including the in-apparatus density adjustment, and when the internal adjustment processing is executed, a series of the plurality of processing is performed.

Similarly, calibration also adjusts parameters related to image formation and includes a plurality of processing including on-paper density adjustment the in-apparatus density adjustment. When the calibration is executed, a series of the plurality of processing is performed.

According to the present exemplary embodiment, the image forming apparatus 101 stores an information table A 600 of the internal adjustment processing in the ROM 105. The information table A 600 records an execution order of processing included in the internal adjustment processing and whether each processing is interruptible during the execution. The information table A 600 further records whether each processing included in the internal adjustment processing overlaps with processing to be performed when calibration is executed. The CPU 104 refers to the information table A 600 and control the execution of the internal adjustment processing. FIG. 6 is an example of the information table A 600 of the internal adjustment processing according to the present exemplary embodiment. In the information table A 600, the processing A, B, and D do not overlap with processing to be performed when calibration is executed. Whereas the processing C and E overlap with the processing to be performed when calibration is executed.

Figure 10A:
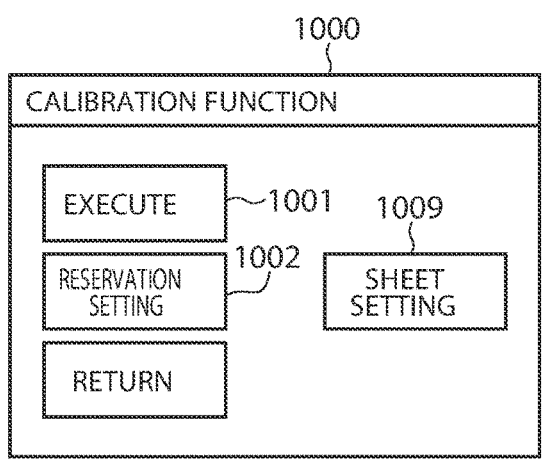
FIGS. 10A to 10D are examples of a user interface (UI) screen regarding to a calibration function according to the exemplary embodiments of the present invention.
Figure 10B:
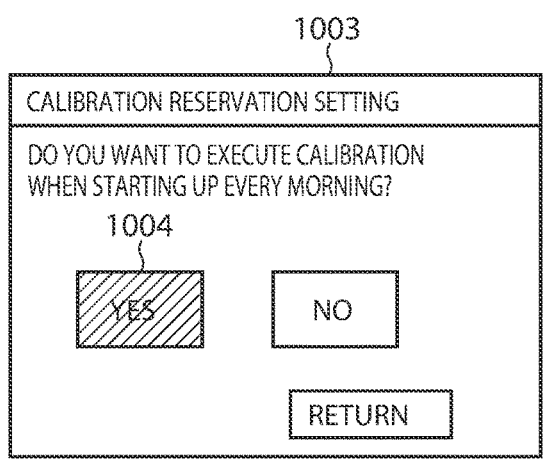
Figure 10C:
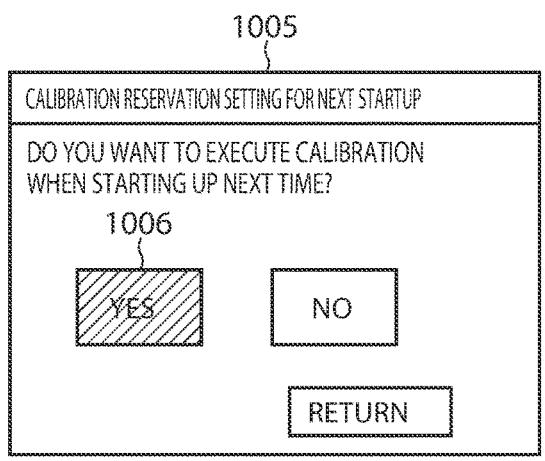

Next, how calibration is performed according to the present exemplary embodiment is described using an example of a user interface (UI) screen illustrated in FIGS. 10A to 10C.

The CPU 104 receives a predetermined operation by a user and displays a calibration instruction screen 1000 as illustrated in FIG. 10A on the display unit 114. When a user presses an "execute" button 1001, the CPU 104 receives a calibration execution instruction.

When the calibration execution instruction is received from the user, the CPU 104 controls the printer 111 to start calibration.

When calibration is executed, a plurality of processing is performed, and at least the on-paper density adjustment is included in the processing. When the on-paper density adjustment is executed, the CPU 104 reflects a measurement result of a patch image fixed onto the sheet 11 measured by the color sensor 42 to the calibration table and each of the image formation conditions. Accordingly, the on-paper density adjustment is executed, and a correction table is created for bringing reproduction characteristics of an image formed by the image forming apparatus 101 close to a target value.

A part of the processing to be performed when calibration is executed overlaps with the processing executed in the internal adjustment processing. For example, the adjustment processing, such as refreshment processing of the development device and potential control of the image forming process, which needs to be performed prior to the in-apparatus density adjustment and the in-apparatus density adjustment fall within the relevant processing. The in-apparatus density adjustment is to create the correction table so as to bring the reproduction characteristics of an image formed by the image forming apparatus 101 close to the target value similar to the on-paper density adjustment, however, a specific method are different. More specifically, for example, a patch image formed on the intermediate transfer member 27 is read by the density sensor 41 disposed near the intermediate transfer member 27, and the measurement result is reflected to voltage conditions and laser power. Accordingly, the maximum density and the halftone characteristic are corrected.

The CPU 104 performs the on-paper density adjustment function to reflect the measurement result of the output characteristics when an image is formed on a sheet to the image formation conditions and then performs the in-apparatus density adjustment.

Accordingly, the in-apparatus density adjustment can be performed based on the result of the on-paper density adjustment, and accuracy of correction is improved.

When a calibration execution instruction is received during execution of the internal adjustment processing, the CPU 104 controls the printer 111 to automatically start execution of calibration immediately after completion of the internal adjustment processing, in other words, within a predetermined time period.

Next, the internal adjustment processing when a calibration execution instruction is received during execution of the internal adjustment processing according to the present exemplary embodiment is described with reference to a flowchart in FIG. 4. Processing in the present flowchart is realized by the CPU 104 of the image forming apparatus 101 executing the processing according to a program stored in the ROM 105.

First, in step S401, the CPU 104 receives a calibration execution instruction from a user. Next, in step S402, the CPU 104 determines whether the printer has started the internal adjustment processing. In step S402, if it is determined that the internal adjustment processing has not been started (NO in step S402), the processing proceeds to step S410, and the CPU 104 executes calibration and completes the processing.

Whereas, in step S402, if it is determined that the internal adjustment processing has been started (YES in step S402), the processing proceeds to step S403. The CPU 104 determines whether the processing being executed is stoppable with reference to the information table A 600 of the internal adjustment processing. In step S403, if it is determined that the processing being executed is not stoppable (NO in step S403), the processing proceeds to step S404. Then, the CPU 104 completes the processing being executed as it is and advances the processing to step S407.

Whereas, in step S403, if it is determined that the processing being executed is stoppable (YES in step S403), the processing proceeds to step S405. In step S405, the CPU 104 determines whether the relevant processing overlaps with the processing to be performed when calibration is executed which is instructed to be executed in step S401 with reference to the information table A 600 of the internal adjustment processing. In step S405, if it is determined that the processing does not overlap with the processing to be performed when calibration is executed (NO in step S405), the processing proceeds to step S404. Then, the CPU 104 completes the processing being executed and advances the processing to step S407.

Whereas, in step S405, if it is determined that the processing overlaps with the processing to be performed when calibration is executed (YES in step S405), the processing proceeds to step S406. The CPU 104 stops the processing being executed and advances the processing to step S407. Next, in step S407, the CPU 104 interrupts the internal adjustment processing. In step S408, the CPU 104 performs reset processing of the internal adjustment processing.

Figure 5:
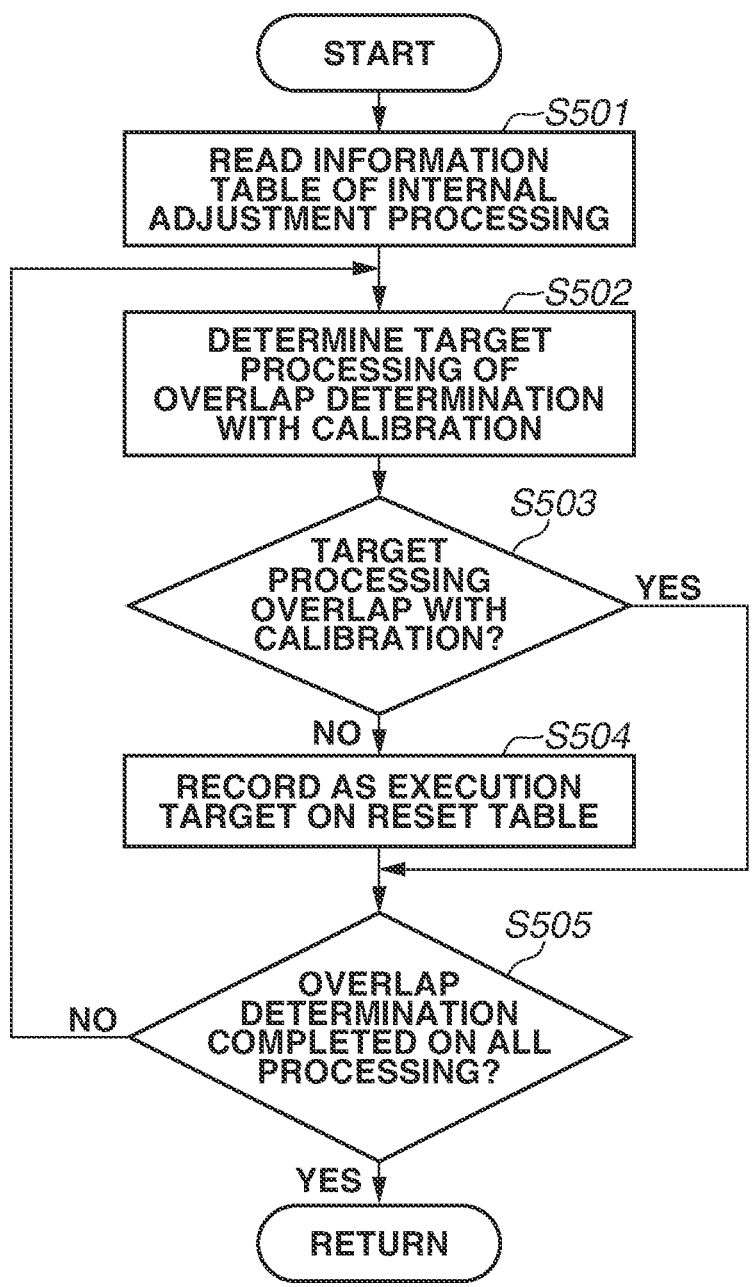
FIG. 5 is a flowchart illustrating reset processing of the internal adjustment processing according to the first exemplary embodiment.

FIG. 5 is a flowchart illustrating the reset processing of the internal adjustment processing. Processing in the present flowchart is realized by the CPU 104 of the image forming apparatus 101 executing the processing according to a program stored in the ROM 105.

First, in step S501, the CPU 104 reads the information table A 600 of the internal adjustment processing from the ROM 105.

In step S502, the CPU 104 determines first processing scheduled to be first executed in unperformed processing as a target of determination processing in step S503.

In step S503, the CPU 104 refers to the information table A 600 of the internal adjustment processing to determine whether the relevant processing overlaps with the processing to be performed when calibration is executed.

If it is determined that the relevant processing does not overlap with the processing to be performed when calibration is executed (NO in step S503), the processing proceeds to step S504. In step S504, the CPU 104 reads a reset table A 700 shown in FIG. 7 from the ROM 105, records the relevant processing as an execution target of the internal adjustment processing, and then advances the processing to step S505. The reset table A 700 includes at least information about each processing to be performed after restart of the internal adjustment processing and an execution order of the processing.

Whereas if it is determined that the relevant processing overlaps with the processing to be performed when calibration is executed (YES in step S503), the processing proceeds to step S505.

In step S505, the CPU 104 determines whether overlap determination processing in step S503 has been performed on all of the unperformed processing.

If it is determined that the determination processing has not been finished on all processing (NO in step S505), the CPU 104 returns the processing to step S502 and determines next processing in the execution order in the information table A 600 as an execution target of the determination processing in step S503 to repeat the above-described processing.

Figure 4:
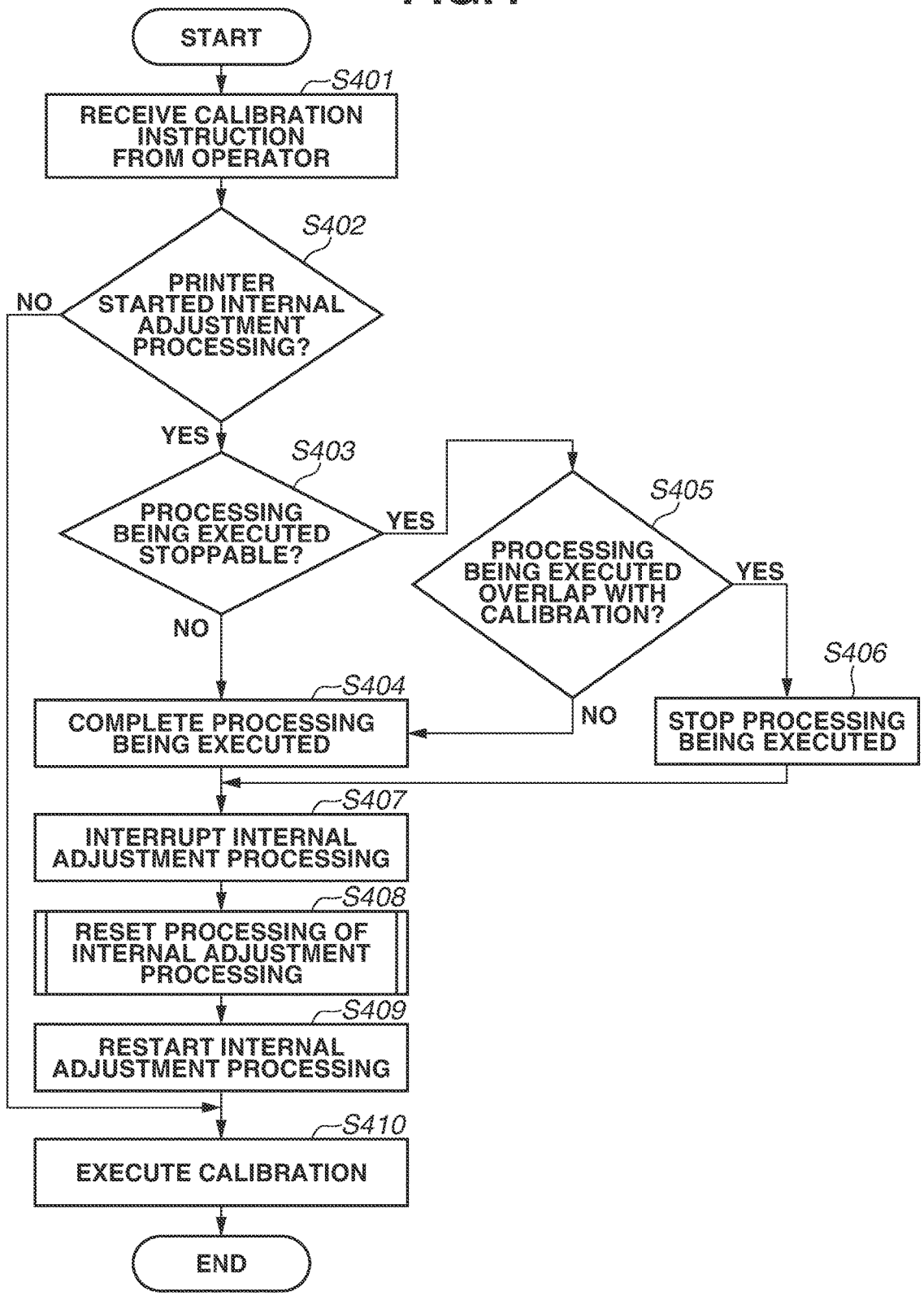
FIG. 4 is a flowchart illustrating the internal adjustment processing according to the first exemplary embodiment.

Whereas if it is determined that the determination processing has been finished on all processing (YES in step S505), the CPU 104 completes the processing in the present flowchart and returns the processing to step S409 in FIG. 4.

Then, in step S409, the CPU 104 executes the rest of the internal adjustment processing according to the reset table A 700 of the internal adjustment processing. The CPU 104 initializes information in the reset table A 700 on the ROM 105 when completing the internal adjustment processing.

When the internal adjustment processing is finished, the CPU 104 executes calibration and completes the processing.

Specific processing which is performed when execution of calibration is instructed during execution of the processing A is described below based on the information table A 600 of the internal adjustment processing in FIG. 6.

In this case, the CPU 104 determines that the processing A is stoppable in step S403 and advances the processing to step S405. In step S405, the CPU 104 determines that the processing A does not overlap with the processing to be performed when calibration is executed, and completes execution of the processing A in step S404.

Then, in step S407, the internal adjustment processing is interrupted, and in step S408, the reset processing of the internal adjustment processing is performed, and as a result, the reset table A 700 shown in FIG. 7 is created. Each of the processing B and subsequent processing are subjected to determination of whether to overlap with the processing to be performed when calibration is executed, and the processing B and the processing D, which are determined not to overlap, are determined as subsequent execution targets and executed.

As described above, according to the present exemplary embodiment, when execution of calibration is instructed during the execution of the internal adjustment processing, processing which overlaps with the processing to be performed when calibration is executed is not performed in is in the internal adjustment processing. More specifically, if calibration is executed within a predetermined time period after the execution of the internal adjustment processing, overlapping processing is performed not in the internal adjustment processing but in the execution of the calibration.

In other words, after completion of the internal adjustment processing, both of the on-paper density adjustment and the in-apparatus density adjustment are processed in turn as calibration. More specifically, processing included in the internal adjustment processing and calibration instructed to be executed, namely adjustment processing such as the in-apparatus density adjustment, refreshment processing of the development device, and potential control of the image forming process are cancelled. Further, these processing are performed after execution of the on-paper density adjustment. Thus, density adjustment is performed based on the result of the on-paper density adjustment.

Therefore, the image forming apparatus can reduce a wait time and consumption of consumable products without deteriorating an image quality to which output characteristics obtained when an image is actually formed on a sheet by execution of calibration is reflected.

According to the above-described first exemplary embodiment, it is described that calibration is instructed by a user after the image forming apparatus 101 is started up, and the internal adjustment processing is started. However, a method for instructing calibration execution is not limited the above-described one.

According to a second exemplary embodiment, a user can reserve execution of calibration at the startup of the image forming apparatus 101 in advance, and a method for optimizing the internal adjustment processing is described.

An example of a calibration execution reservation method is described with reference to the UI screens in FIGS. 10A to 10D.

When the CPU 104 receives a predetermined operation by a user, the CPU 104 displays the calibration execution instruction screen in FIG. 10A on the display unit 114. When the user presses a "reservation setting" button 1002, the CPU 104 displays a calibration reservation setting screen 1003 in FIG. 10B on the display unit 114. When the user presses a "YES" button 1004, the CPU 104 receives calibration execution reservation after startup of the image forming apparatus 101. According to the present exemplary embodiment, the calibration execution reservation method is exemplified in the above-described method, however, a reservation method is not limited thereto.

For example, the CPU 104 may display a calibration reservation setting screen 1005 in FIG. 10C on the display unit 114 when shutting down the image forming apparatus 101. If a user presses a "YES" button 1006, the CPU 104 may control the image forming apparatus 101 to execute calibration when starting up next time.

In addition, reservation can be set in more detail by allowing a user to specify date conditions including a day of week, date, and the like. Further, reservation can be set not from the operation unit 113 of the image forming apparatus 101 but from an operation unit, not illustrated, installed in the information processing apparatus 100. Furthermore, the ROM 105 may record an execution history of calibration, and the CPU 104 may predict a trend of calibration execution after startup from the execution history and automatically make the reservation. Thus, a calibration execution reservation can be set at a predetermined timing.

Figure 8:
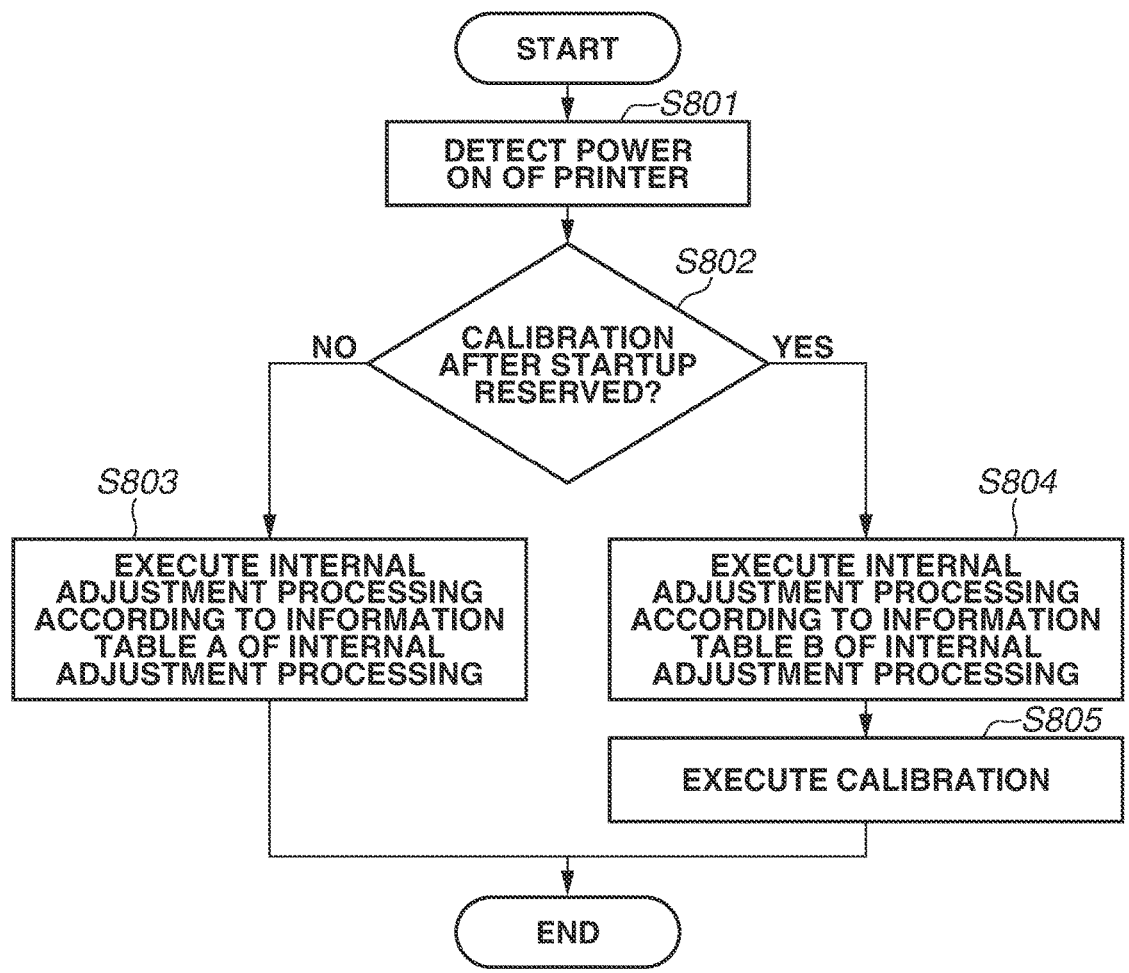
FIG. 8 is a flowchart illustrating the internal adjustment processing according to the second exemplary embodiment, a third exemplary embodiment, and a fourth exemplary embodiment.

Next, an embodiment of the internal adjustment processing based on whether the calibration execution reservation is made after startup of the image forming apparatus 101 is described with reference to a processing flowchart in FIG. 8. Processing in the present flowchart is realized by the CPU 104 of the image forming apparatus 101 executing the processing according to a program stored in the ROM 105.

First, in step S801, the CPU 104 detects that the power source of the printer 111 is turned on and advances the processing to step S802. Next, in step S802, the CPU 104 determines whether calibration execution after startup is reserved. In step S802, if it is determined that the calibration is not reserved (NO in step S802), then in step S803, the CPU 104 performs control to execute the internal adjustment processing as indicated in the above-described information table A 600 and then completes the processing flow.

Figure 9:
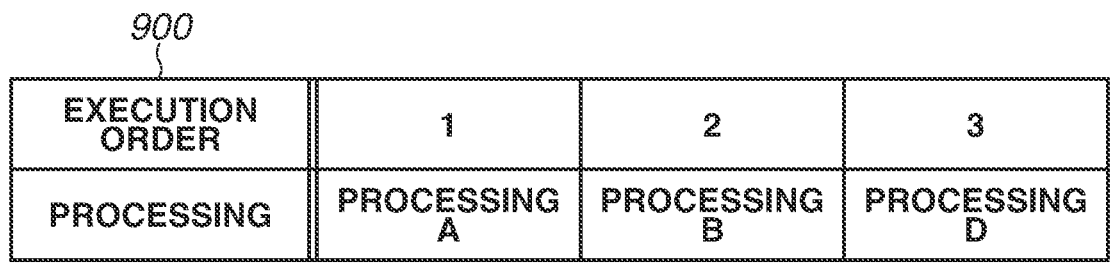
FIG. 9 is an example of an information table B 900 of the internal adjustment processing according to the exemplary embodiments of the present invention.

Whereas, in step S802, if it is determined that the calibration is reserved (YES in step S802), then in step S804, the CPU 104 executes the internal adjustment processing according to information recorded in an information table B 900 shown in FIG. 9. The information table B 900 is stored in the ROM 105, and processing which does not overlap with the processing to be performed when calibration is executed is only registered therein among the processing recorded in the information table A 600. In other words, if calibration is scheduled to be executed within a predetermined time period after execution of the internal adjustment processing, processing included in the internal adjustment processing and in the calibration processing is not performed.

According to the present exemplary embodiment, processing registered in the information table B 900 are only the processing A, the processing B, and the processing D, which are indicated in the information table A 600 as "NO" about overlap with the processing to be performed when calibration is executed. Therefore, in step S804, the CPU 104 executes the internal adjustment processing in the order of the processing A, the processing B, and the processing D. Then, in step S805, the CPU 104 executes calibration and completes the processing flow.

If calibration reserved by a user cannot be executed by some reasons, such as paper shortage, the CPU 104 may not execute optimization processing of the internal adjustment processing in the above described exemplary embodiment.

Accordingly, the present exemplary embodiment can avoid a situation in which originally required adjustment processing is not performed because the internal adjustment processing is performed by omitting predetermined processing and then calibration is not executed. Therefore, the present exemplary embodiment can prevent printing from being executed in a state in which an appropriate image quality is not ensured.

According to the present exemplary embodiment, optimization processing is automatically applied based on an advanced reservation state of calibration and after dealing with processing first performed in execution of the internal adjustment processing. Therefore, in a system in which calibration can be reserved in advance, a user can enjoy an effect of the optimization processing without being conscious of it. In other words, the in-apparatus density adjustment included in the internal adjustment processing is cancelled, and the in-apparatus density adjustment is performed after execution of the on-paper density adjustment. Thus, density adjustment is performed based on the result of the on-paper density adjustment.

Therefore, the image forming apparatus can reduce a wait time and consumption of consumable products without deteriorating an image quality to which output characteristics obtained when an image is actually formed on a sheet by execution of calibration is reflected.

According to a third exemplary embodiment, it is described the image forming apparatus which can switch a plurality of image forming modes in response to information of a sheet to be used in printing. Switching of the image forming mode is to switch parameters related to an image forming process, such as an image speed, transfer, and fixation. The CPU 104 refers to, for example, grammage information of a sheet as shown in FIG. 11 to determine the image forming mode. In addition, the CPU 104 may refer to other sheet information, such as a surface property, which is not described in the following exemplary embodiment.

According to the present exemplary embodiment, the image forming apparatus 101 stores an information table C 1500 of the internal adjustment processing in the ROM 105. The information table C 1500 includes information about an image forming mode targeted by each processing included in the internal adjustment processing in addition to the information recorded in the information table A 600 described in the first exemplary embodiment. The CPU 104 refers to the information table C 1500 to control execution of the internal adjustment processing.

Figure 12:
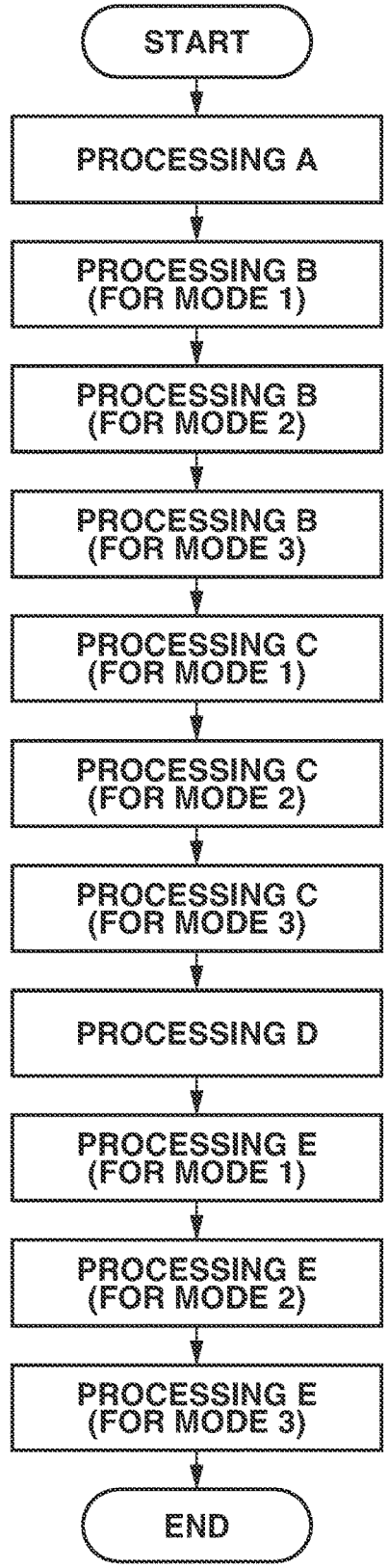
FIG. 12 illustrates a processing flow of the internal adjustment processing according to the third exemplary embodiment and the fourth exemplary embodiment.

FIG. 12 illustrates a processing flow of the internal adjustment processing in the image forming apparatus which has a plurality of image forming modes. The internal adjustment processing includes both of processing independent from the image forming mode and processing dependent on the image forming mode. Processing independent from the image forming mode is executed only once by the CPU 104 as the processing A and the processing D in FIG. 12. On the other hand, processing dependent on the image forming mode is executed each for the image forming modes 1 to 3 as the processing B, the processing C, and the processing E in FIG. 12.

Next, calibration according to the present exemplary embodiment is described. Image formation conditions are different among the plurality of image forming modes, and difference occurs among image qualities of their print results. Thus, the image forming apparatus executes calibration in each of the plurality of image forming modes and can realize a stable image quality regardless of sheet attributes. For example, as shown in FIG. 11, a calibration execution mode 1, a calibration execution mode 2, and a calibration execution mode 3 are respectively prepared for the image forming mode 1, the image forming mode 2, and the image forming mode 3.

Next, a determination method of the calibration execution mode according to the present exemplary embodiment is described. When the CPU 104 receives a predetermined operation by a user, the CPU 104 displays the calibration execution instruction screen in FIG. 10A on the display unit 114. When a user presses a "sheet setting" button 1009, the CPU 104 displays a calibration sheet setting screen 1010 in FIG. 10D on the display unit 114. In the calibration sheet setting screen 1010, sheet option buttons 1011 to 1014 are displayed which are used for execution of calibration to form a patch image. If a user presses any of the sheet option buttons 1011 to 1014 and then presses a determination button 1015, the CPU 104 receives a calibration sheet setting. A case when a "thick paper" button 1013 is selected as a calibration sheet is described below as an example.

With respect to each option of the calibration sheet, sheet attribute information, such as a grammage, is defined in advance. The CPU 104 refers to both of the sheet attribute information and a relationship between the sheet and the calibration execution mode indicated in FIG. 11 to determine the calibration execution mode. According to the present exemplary embodiment, a grammage of "thick paper" is defined as "230 g". Therefore, as indicated in FIG. 11, the CPU 104 determines the calibration execution mode as a "mode 2" targeting on a sheet having a grammage of 200 g to 250 g.

Next, the internal adjustment processing when a calibration execution instruction is received during execution of the internal adjustment processing according to the present exemplary embodiment is described with reference to a flowchart in FIG. 13. Processing in the present flowchart is realized by the CPU 104 of the image forming apparatus 101 executing the processing according to a program stored in the ROM 105.

First, in step S1301, the CPU 104 receives a calibration execution instruction from a user. Then, in step S1302, the CPU 104 specifies the calibration execution mode.

Next, in step S1303, the CPU 104 determines whether the printer has started the internal adjustment processing. In step S1303, if it is determined that the internal adjustment processing has not been started (NO in step S1303), the processing proceeds to step S1313, and the CPU 104 executes calibration and completes the processing.

Whereas, in step S1303, if it is determined that the internal adjustment processing has been started (YES in step S1303), the processing proceeds to step S1304, and the CPU 104 determines whether the processing being executed is stoppable with reference to the information table C 1500 of the internal adjustment processing. In step S1304, if it is determined that the processing being executed is not stoppable (NO in step S1304), the processing proceeds to step S1305. Then, the CPU 104 completes the processing being executed as it is and advances the processing to step S1310.

Whereas, in step S1304, if it is determined that the processing being executed is stoppable (YES in step S1304), the processing proceeds to step S1306. In step S1306, the CPU 104 determined whether the relevant processing overlaps with the processing to be performed when calibration is executed with reference to the information table C 1500 of the internal adjustment processing. In step S1306, if it is determined that the relevant processing does not overlap with the processing to be performed when calibration is executed (NO in step S1306), the processing proceeds to step S1305. Then, the CPU 104 completes the processing being executed and advances the processing to step S1310.

Whereas, in step S1306, if it is determined that the relevant processing overlaps with the processing to be performed when calibration is executed (YES in step S1306), the processing proceeds to step S1307. In step S1307, the CPU 104 determines whether the relevant processing is independent from the image forming mode with reference to the information table C 1500 of the internal adjustment processing. In step S1307, if it is determined that the relevant processing is independent from the image forming mode (YES in step S1307), the processing proceeds to step S1305. Then, the CPU 104 completes the processing being executed and advances the processing to step S1310.

Whereas, in step S1307, if it is determined that the relevant processing is not independent from the image forming mode (NO in step S1307), the processing proceeds to step S1308. In step S1308, the CPU 104 determines whether the relevant processing targets on the image forming mode associated with the calibration execution mode specified in step S1302 with reference to the information table C 1500 of the internal adjustment processing. In step S1308, if it is determined that the relevant processing does not target on the image forming mode associated with the calibration execution mode (NO in step S1308), the processing proceeds to step S1305. Then, the CPU 104 completes the processing being executed and advances the processing to step S1310.

Whereas, in step S1308, if it is determined that the relevant processing targets on the image forming mode associated with the calibration execution mode (YES in step S1308), the processing proceeds to step S1309. The CPU 104 stops the processing being executed and advances the processing to step S1310. In step S1310, the CPU 104 interrupts the internal adjustment processing. Then, in step S1311, the CPU 104 performs reset processing of the internal adjustment processing.

Figure 14:
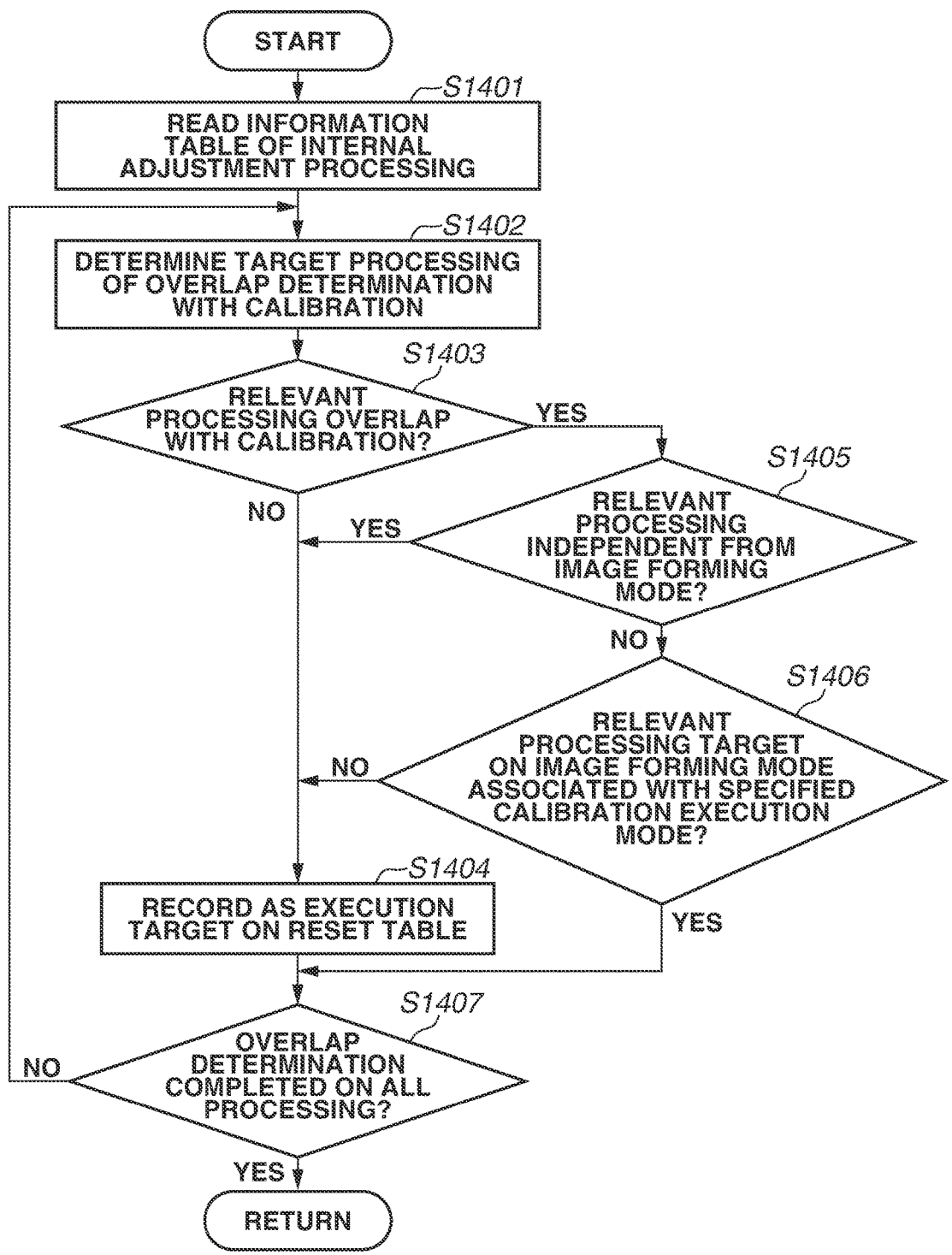
FIG. 14 is a flowchart illustrating the reset processing of the internal adjustment processing according to the third exemplary embodiment.

FIG. 14 is a flowchart illustrating the reset processing of the internal adjustment processing. Processing in the present flowchart is realized by the CPU 104 of the image forming apparatus 101 executing the processing according to a program stored in the ROM 105.

First, in step S1401, the CPU 104 reads the information table C 1500 of the internal adjustment processing from the ROM 105.

In step S1402, the CPU 104 determines first processing scheduled to be first executed in unperformed processing as a target of determination processing in step S1403.

In step S1403, the CPU 104 refers to the information table C 1500 of the internal adjustment processing to determine whether the relevant processing overlaps with the processing to be performed when calibration is executed.

If it is determined that the relevant processing does not overlap with the processing to be performed when calibration is executed (NO in step S1403), the processing proceeds to step S1404. In step S1404, the CPU 104 reads a reset table B 1600 shown in FIG. 16 from the ROM 105, records the relevant processing as an execution target of the internal adjustment processing, and then advances the processing to step S1407. The reset table B 1600 includes at least information about each processing to be performed at the restart of the internal adjustment processing and an execution order of the processing.

Whereas if it is determined that the relevant processing overlaps with the processing to be performed when calibration is executed (YES in step S1403), the processing proceeds to step S1405.

In step S1405, the CPU 104 determines whether the relevant processing is independent from the image forming mode with reference to the information table C 1500 of the internal adjustment processing. In step S1405, if it is determined that the relevant processing is independent from the image forming mode (YES in step S1405), the processing proceeds to step S1404. The processing in step S1404 is as described above. Then, the CPU 104 advances the processing to step S1407.

Whereas, in step S1405, if it is determined that the relevant processing is not independent from the image forming mode (NO in step S1405), the processing proceeds to step S1406. In step S1406, the CPU 104 determines whether the relevant processing targets on the image forming mode associated with the calibration execution mode specified in step S1302 with reference to the information table C 1500 of the internal adjustment processing. In step S1406, if it is determined that the relevant processing does not target on the image forming mode associated with the calibration execution mode (NO in step S1406), the processing proceeds to step S1404. The processing in step S1404 is as described above. Then, the CPU 104 advances the processing to step S1407.

Whereas, in step S1406, if it is determined that the relevant processing targets on the image forming mode associated with the calibration execution mode (YES in step S1406), the processing proceeds to step S1407.

In step S1407, the CPU 104 determines whether overlap determination processing in step S1403 has been performed on all of the unperformed processing.

If it is determined that the determination processing has not been finished on all processing (NO in step S1407), the CPU 104 returns the processing to step S1402 and determines next processing in the execution order in the information table C 1500 as an execution target of the determination processing in step S1403 to repeat the above-described processing.

Figure 13:
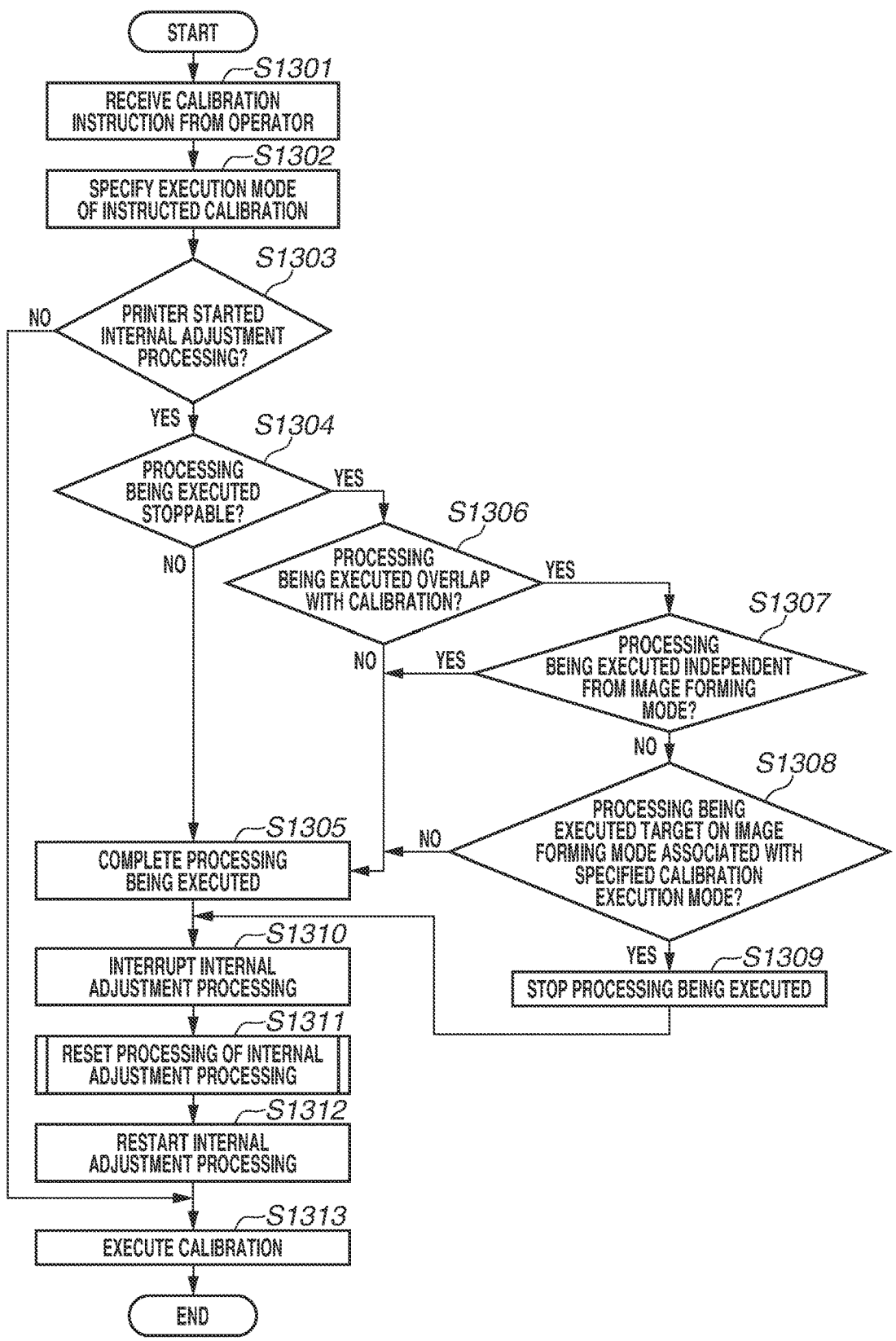
FIG. 13 is a flowchart illustrating the internal adjustment processing according to the third exemplary embodiment.

Whereas if it is determined that the determination processing has been finished on all processing (YES in step S1407), the CPU 104 completes the processing in the present flowchart and returns the processing to step S1312 in FIG. 13.

Then, in step S1312, the CPU 104 executes the rest of the internal adjustment processing according to the reset table B 1600 of the internal adjustment processing. The CPU 104 initializes information in the reset table B 1600 on the ROM 105 when completing the internal adjustment processing.

When the internal adjustment processing is finished, the CPU 104 executes calibration in step S1313 and completes the processing.

Specific processing which is performed when execution of calibration using "thick paper" is instructed during execution of the processing A is described below based on the information table C 1500 of the internal adjustment processing in FIG. 15.

Description of the determination processing with respect to the processing A being executed is omitted since it is similar to that in the first exemplary embodiment.

In step S1310, the internal adjustment processing is interrupted, and in step S1311, the reset processing of the internal adjustment processing is performed, and as a result, the reset table B 1600 shown in FIG. 16 is created. As a result that the determination processing in steps S1306, S1307, and S1308 are each performed on each of the processing B and subsequent processing, processing which overlaps with calibration and targets on the image forming mode 2 is excluded, and processing other than that are set as subsequent execution targets.

Next, a method for optimizing the internal adjustment processing when execution of calibration at startup is reserved in the image forming apparatus having a plurality of image forming modes is described with reference to the processing flowchart in FIG. 8. Processing in the present flowchart is realized by the CPU 104 of the image forming apparatus 101 executing the processing according to a program stored in the ROM 105.

The processing in step S801 is same as that in the second exemplary embodiment, and the description thereof is omitted.

In step S802, the CPU 104 determines whether calibration execution after startup is reserved. In step S802, if it is determined that the calibration is not reserved (NO in step S802), the CPU 104 performs control to execute the internal adjustment processing as indicated in the above-described information table C 1500 and then complete the processing flow.

Whereas, in step S802, if it is determined that the calibration is reserved (YES in step S802), the CPU 104 executes the internal adjustment processing according to information recorded in an information table D 1700 shown in FIG. 17. The information table D 1700 is recorded in the ROM 105 as many as the number of the calibration execution modes. A case when calibration using "thick paper", namely calibration in the calibration execution mode 2 is reserved is described below as an example. Processing registered in the information table D 1700 is processing indicated as "NO" about overlap with the processing to be performed when calibration is executed or processing of which target image forming mode is other than "mode 2" among the processing recorded in the information table C 1500. In other words, if calibration in the mode 2 is scheduled to be executed within a predetermined time period after execution of the internal adjustment processing, processing included in the internal adjustment processing and in the calibration processing in the mode 2 is not performed.

In step S804, the CPU 104 executes the internal adjustment processing in the order recorded in the information table D 1700. Then, in step S805, the CPU 104 executes calibration and completes the processing flow.

If calibration reserved by a user cannot be executed by some reasons, such as paper shortage, the CPU 104 may not execute optimization processing of the internal adjustment processing in the above described exemplary embodiment.

Accordingly, the present exemplary embodiment can avoid a situation in which originally required adjustment processing is not performed because the internal adjustment processing is performed by omitting predetermined processing and then calibration is not executed. Therefore, the present exemplary embodiment can prevent printing from being executed in a state in which an appropriate image quality is not ensured.

Further, if calibration reserved by a user cannot be executed, the CPU 104 may execute the optimization processing of the above-described internal adjustment processing and then suspend printing in the image forming mode associated with calibration. If a cause in preventing execution of calibration is removed, and calibration is executed, then the CPU 104 restarts a suspended print job.

While the printing in the image forming mode associated with the reserved calibration is suspended, the CPU 104 precedently performs printing in an image forming mode other than the relevant image forming mode.

Accordingly, printing can be prevented from being performed in a state in which an appropriate image quality is not ensured while maintaining an effect of the optimization of the internal adjustment processing. In addition, printing in the other image forming mode is precedent thereto, and a down-time of the apparatus can be reduced.

As described above, according to the present exemplary embodiment, the optimization processing is applied to the image forming apparatus having a plurality of image forming modes and calibration modes in response to the calibration mode instructed to be executed. Accordingly, the optimization processing can be performed by appropriately narrowing down the target image forming mode.

Therefore, the image forming apparatus can reduce a wait time and consumption of consumable products without deteriorating an image quality in the image forming mode which is not the target of calibration.

According to the above-described third exemplary embodiment, an optimization method of the internal adjustment processing is described in the case that execution and reservation of a single mode calibration is instructed. However, the optimization method is not limited to the above-described one. Optimization of the internal adjustment processing can be performed in the image forming apparatus which can simultaneously receive calibration instructions in a plurality of modes.

Figure 10D:
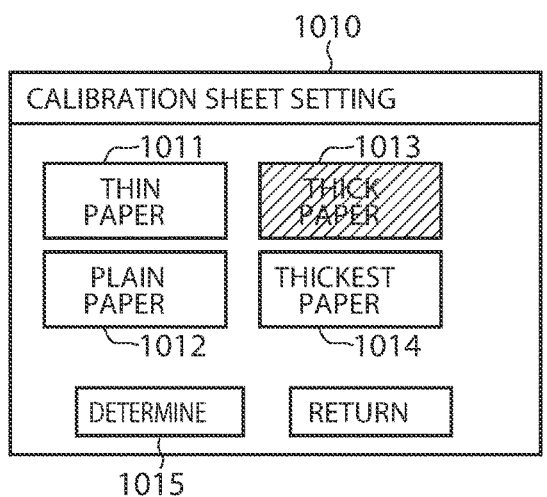

According to a fourth exemplary embodiment, a plurality of options can be selected from the sheet option buttons 1011 to 1014 on the calibration sheet setting screen 1010 in FIG. 10D. A case when two of "thick paper" and "thickest paper" are selected as calibration sheets is described below as an example. A grammage of "thickest paper" is defined as "270 g". Thus, the calibration execution mode using the "thickest paper" will be a "mode 3" as shown in FIG. 11.

When calibration execution instructions in a plurality of modes are simultaneously received, the image forming apparatus 101 executes calibration in each mode in turn in a predetermined order. According to the present exemplary embodiment, calibration is executed in the order of the mode 2 and the mode 3.

First, the internal adjustment processing when the image forming apparatus having a plurality of image forming modes receives calibration execution instructions in a plurality of modes during execution of the internal adjustment processing is described with reference to the flowcharts in FIGS. 13 and 14. Processing in the present flowchart is realized by the CPU 104 of the image forming apparatus 101 executing the processing according to a program stored in the ROM 105. The processing overlapping with that in the third exemplary embodiment is not described in below.

In step S1302 and step S1402, the CPU 104 specifies the calibration execution mode as the "mode 2" and the "mode 3".

Further, in step S1308 and step S1406, the CPU 104 determines whether the relevant processing targets on the image forming mode 2 or the image forming mode 3 with reference to the information table C 1500 of the internal adjustment processing.

Thus, if execution of calibration using "thick paper" and "thickest paper" is instructed during execution of the processing A, a reset table C 1800 shown in FIG. 18 is created. As a result that the determination processing in steps S1306, S1307, and S1308 are each performed on each of the processing B and subsequent processing, processing which overlaps with calibration and targets on the image forming mode 2 or 3 is excluded, and processing other than that are set as subsequent execution targets.

Next, a method for optimizing the internal adjustment processing when execution of calibration at startup is reserved in a plurality modes in the image forming apparatus having a plurality of image forming modes is described with reference to the processing flowchart in FIG. 8. Processing in the present flowchart is realized by the CPU 104 of the image forming apparatus 101 executing the processing according to a program stored in the ROM 105. The processing overlapping with that in the third exemplary embodiment is not described in below.

In step S802, if it is determined that the calibration is reserved (YES in step S802), the CPU 104 executes the internal adjustment processing according to information recorded in an information table E 1900 shown in FIG. 19. According to the present exemplary embodiment, the information table E 1900 is recorded in the ROM 105 as many as the number of combinations of the calibration execution modes which can be reserved. A case when calibration using "thick paper" and "thickest paper", namely calibration in the execution modes 2 and 3 are reserved is described below as an example.

Processing registered in the information table E 1900 is processing indicated as "NO" about overlap with the processing to be performed when calibration is executed or processing of which target image forming mode is other than "mode 2" or "mode 3" among the processing recorded in the information table C 1500. In other words, if calibration in the mode 2 or the mode 3 is scheduled to be executed within a predetermined time period after execution of the internal adjustment processing, processing included in the internal adjustment processing and in the calibration processing in the mode 2 or the mode 3 is not performed.

As described above, according to the present exemplary embodiment, the optimization processing is applied to the image forming apparatus having a plurality of image forming modes and calibration modes in response to a combination of the plurality of calibration modes instructed to be executed by a user. Accordingly, even the image forming apparatus which simultaneously receives calibration in a plurality of modes can perform the optimization processing by appropriately narrowing down the target image forming mode.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus, comprising:
an image forming unit;
a processor and a memory storing computer code that, when executed by the processor, causes the image forming apparatus to have a first processing mode and a second processing mode,
wherein the first processing mode includes at least a first processing unit and a first correction data generation unit, and the second processing mode includes at least a second correction data generation unit,
wherein the first processing unit executes first processing,
wherein the first correction data generation unit, by using a result of measurement of an image formed by the image forming unit on an intermediate image transfer member, generates first correction data for correcting a color value of the image formed by the image forming unit,
wherein generation of the first correction data by the first correction data generation unit is one of processing to be performed at time of startup of the image forming apparatus, and
wherein the second correction data generation unit, by using a result of measurement of an image formed by the image forming unit on paper, generates second correction data for correcting a color value of the image formed by the image forming unit; and
a control unit configured to:
in a case where the first processing mode and the second processing mode are executed successively, control execution of the first processing unit and skipping execution of the first correction data generation unit from among processing in the first processing mode, and successively control execution of the second processing mode, and in a case where the first processing mode and the second processing mode are executed not successively, control execution of the first processing unit and the first correction data generation unit in the first processing mode.

2. The image forming apparatus according to claim 1, wherein, upon the completion of the startup of the image forming apparatus, either the generation of the second correction data by the second correction data generation unit after the generation of the first correction data by the first correction data generation unit or the generation of the second correction data by the second correction data generation unit without the generation of the first correction data by the first correction data generation unit is selectively executed.

3. The image forming apparatus according to claim 1, wherein the generation of the first correction data by the first correction data generation unit is executed automatically at the time of the startup of the image processing apparatus and predetermined timing.

4. The image forming apparatus according to claim 3, wherein the predetermined timing is time and date specified by a user, or timing predicted by the image forming apparatus.

5. The image forming apparatus according to claim 1, wherein the image forming apparatus includes a sensor for performing measurement on paper on which a recording material has become fixed over a paper conveying path.

6. The image forming apparatus according to claim 5, wherein paper on which the image used for generating the second correction data has been formed is measured using the sensor.

7. The image forming apparatus according to claim 1, wherein the control unit is configured to perform control to:
after the generation of the second correction data by the second correction data generation unit, execute generation of the first correction data by the first correction data generation unit based on a result of the generation of the second correction data.

8. A method for an image forming apparatus having a first processing mode and a second processing mode, wherein the first processing mode includes at least first processing and first correction data generation and the second processing mode includes at least second correction data generation, the method comprising:
execute the first processing;
the first correction data generation of, by using a result of measurement of an image formed by an image forming unit on an intermediate image transfer member, generating first correction data for correcting a color value of the image formed by the image forming unit, wherein generation of the first correction data is one of processing to be performed at time of startup of the image forming apparatus;
the second correction data generation of, by using a result of measurement of an image formed by the image forming unit on paper, generating second correction data for correcting a color value of the image formed by the image forming unit;
in a case where the first processing mode and the second processing mode are executed successively, control execution of the first processing and skipping execution of the first correction data generation from among processing in the first processing mode, and successively control execution of the second processing mode, and
in a case where the first processing mode and the second processing mode are executed not successively, control execution of the first processing and the first correction data generation in the first processing mode.

9. A non-transitory storage medium storing a program causing a computer to execute a method for an image forming apparatus having a first processing mode and a second processing mode, wherein the first processing mode includes at least first processing and first correction data generation and the second processing mode includes at least second correction data generation, the method comprising:
execute the first processing;
the first correction data generation of, by using a result of measurement of an image formed by an image forming unit on an intermediate image transfer member, generating first correction data for correcting a color value of the image formed by the image forming unit, wherein generation of the first correction data is one of processing to be performed at time of startup of the image forming apparatus;
the second correction data generation of, by using a result of measurement of an image formed by the image forming unit on paper, generating second correction data for correcting a color value of the image formed by the image forming unit;
in a case where the first processing mode and the second processing mode are executed successively, control execution of the first processing and skipping execution of the first correction data generation from among processing in the first processing mode, and successively control execution of the second processing mode, and
in a case where the first processing mode and the second processing mode are executed not successively, control execution of the first processing and the first correction data generation in the first processing mode.

* * * * *